United States Patent [19]

Kando et al.

[11] Patent Number: 4,653,865

[45] Date of Patent: Mar. 31, 1987

[54] LIQUID CRYSTAL DISPLAY DEVICE

[75] Inventors: Yasuhiko Kando; Tamihito Nakagomi; Shinji Hasegawa; Yoshio Hanada, all of Mobara, Japan

[73] Assignee: Hitachi, Ltd., Tokyo, Japan

[21] Appl. No.: 847,166

[22] Filed: Apr. 2, 1986

[30] Foreign Application Priority Data

Apr. 5, 1985 [JP] Japan .................. 60-70950

[51] Int. Cl.⁴ ........................................ G02F 1/13
[52] U.S. Cl. ...................... 350/346; 350/337; 350/347 E
[58] Field of Search ................ 350/337, 346, 347 E

[56] References Cited

U.S. PATENT DOCUMENTS

| | | | |
|---|---|---|---|
| 4,398,805 | 8/1983 | Cole | 350/346 X |
| 4,579,425 | 4/1986 | Ishii et al. | 350/346 |
| 4,596,446 | 6/1986 | Waters et al. | 350/346 |

FOREIGN PATENT DOCUMENTS

| | | | |
|---|---|---|---|
| 55-127520 | 10/1980 | Japan | 350/346 |
| 58-193523 | 11/1983 | Japan | 350/346 |

OTHER PUBLICATIONS

Ishibashi, T., et al., "On the Multiplexing of the Phase Change Type Color LCD", 1980 IEEE Biennial Display Research Conference (Oct. 1980) pp. 186–188.

*Primary Examiner*—John K. Corbin
*Assistant Examiner*—Richard F. Gallivan
*Attorney, Agent, or Firm*—Antonelli, Terry & Wands

[57] ABSTRACT

A liquid crystal display device wherein a nematic liquid crystal having a positive dielectric anisotropy and added with a chiral material is sealed between a pair of upper and lower substrates so as to constitute a helical structure twisted within a range between 140° and 250° along a direction of thickness thereof, and polarizing axes or absorption axes of a pair of polarizing plates disposed on the upper and lower substrates are angularly displaced by a predetermined angle or predetermined angles from major axes of liquid crystal molecules adjacent to the upper and lower substrates, respectively, and a ratio of thickness of the nematic liquid crystal to a natural molecular helical pitch of the nematic liquid crystal added with a chiral material falls within a range of from 0.14 to 0.60 inclusive.

9 Claims, 8 Drawing Figures

LIQUID CRYSTAL DISPLAY DEVICE

BACKGROUND OF THE INVENTION

The present invention relates to a liquid crystal display device and, more particularly, to an improvement in a field effect liquid crystal display device for time-multiplexed driving.

A conventional so-called twisted nematic liquid crystal display device has a 90° twisted helical structure of a nematic liquid crystal having positive dielectric anisotropy and sealed between two substrates having transparent electrodes arranged thereon in desired display patterns as described in G.B. Pat. No. 1,372,868. Polarizing plates are arranged on outer surfaces of the substrates such that polarizing or absorption axes thereof become perpendicular or parallel to the major axes of the liquid crystal molecules adjacent to the substrates.

In order to twist the liquid crystal molecules between the two substrates through 90°, orienting layers are formed on said electrodes and exposed surfaces of the substrates by coating polyimide resin and making numerous fine grooves by rubbing the coated surfaces which contact the liquid crystal molecules by a cloth along one direction. In this case, the major axes of the liquid crystal molecules adjacent to the surface become parallel to this one direction, i.e., a rubbing direction. Two rubbed surfaces are spaced apart so as to oppose each other while their rubbing directions are crossed at about 90°. These rubbed substrates are then sealed with a sealing agent, and a nematic liquid crystal having positive dielectric anisotropy is filled in a space formed between the substrates. Therefore, the major axes of the liquid crystal molecules are twisted through about 90° between the substrates. The resultant liquid crystal cell is sandwiched between a pair of polarizing plates with their polarizing or absorption axes substantially parallel to the major axes of liquid crystal molecules adjacent thereto, respectively. In a conventional reflective type liquid crystal display device which is most frequently used, a reflector is disposed on the outer surface of the lower polarizing plate. Light incident on the upper surface of the device is linearly polarized by the polarizing plate or polarizer. In a portion of a liquid crystal layer which is not applied with a voltage, the plane of polarization of the linearly polarized light is rotated through 90° along the helical structure and is transmitted through the lower polarizing plate. The light is then reflected by the reflector and returns to the upper surface of the device. However, in a portion of the liquid crystal layer which is applied with a voltage, where the helical structure is destroyed, the plane of polarization of the linearly polarized light will not be rotated. Therefore, the linearly polarized light transmitted through the upper polarizing plate is blocked by the lower polarizing plate and will not reach the reflector. In this manner, electrical signals can be converted into optical images in accordance with the presence or absence of an electrical potential applied across the liquid crystal layer.

The twisted nematic type liquid crystal display device (hereinafter referred to as "TN-LCD" for short), owing to its merits such as low driving voltage, low power consumption, small thickness, and light weight, has found extensive utility in wrist watches, desk-top computers, various industrial measuring instruments, and automotive instruments.

The dot matrix type TN-LCD which is capable of displaying letters and figures has long been arousing much interest as useful for display devices in portable computers and various data terminals. At present 64×480 and 128×480 dot matrix display devices multiplexed at a 1/64 duty factor are on the market. The demand in market, however, is shifting to LCD's with still higher contents of display and information density such as those of 200×640 picture elements and 256×640 picture elements which are equivalent in display capacity to cathode-ray picture tubes. For such LCD's to be commercially feasible, they are required to be effectively driven in a highly time-multiplexed fashion of the order of duty factor of 1/100 or 1/128.

FIG. 1 is a graph showing typical luminance-voltage characteristics of a conventional reflective type liquid crystal display device having a 90° twisted helical structure of a nematic liquid crystal and with axes of its polarizers intersecting at right angles. The graph shows the relative luminance of reflected light as a function of the applied voltage. An initial value of luminance is taken as 100% with no votage applied, and a final value when little or no further change in luminance occurs at sufficiently high voltage is taken as 0%. In practice, a pixel is sufficiently bright when the relative luminance is more than 80%, so that the pixel is considered to be in an OFF state, and when the relative luminance is less than 20%, the pixel is dark enough for further decrease in luminance to be imperceptible to the eye, and hence the pixel is considered to be in an ON state. Voltages corresponding to 80% and 20% of relative luminances are given as the threshold voltage Vth and the saturation voltage Vsat, respectively, hereinafter. In other words, the threshold voltage Vth is given as a maximum allowable voltage corresponding to the OFF state, and the saturation voltage Vsat is given as a minimum allowable voltage corresponding to the ON state. For a transmissive type liquid crystal display device, FIG. 1 would represent transmission-voltage characteristics.

The electrooptical characteristics of the liquid crystal display device change in accordance with a viewing angle. These characteristics limit a viewing angle range within which a good display quality is obtained. A viewing angle $\phi$ will be defined with reference to FIG. 2. Referring to FIG. 2, in a liquid crystal display device 1, a nematic liquid crystal 33 having positive dielectric anisotropy is sandwiched between two substrates 11, 12 having transparent electrodes arranged thereon in desired display patterns and orienting layers (not shown) which are formed on the electrodes and exposed surfaces of the substrates by coating, for example, polyimide resin and making numerous fine grooves by rubbing the coated surfaces with a cloth unidirectionally. A rubbing direction of an upper substrate 11 of a liquid crystal display device 1 is represented by reference numeral 2, a rubbing direction of a lower substrate 12 is represented by reference numeral 3, and a twist angle between major axes of liquid crystal molecules adjacent to the upper substrate and those of liquid crystal molecules adjacent to the lower substrate is represented by 4.

X- and Y-axes are located on the surface of the liquid crystal display device 1. The X-axis defines a direction for bisecting the twist angle 4 of the liquid crystal molecules. A Z-axis defines a normal to the X-Y plane. An angle between a viewing direction 5 and the Z-axis is defined as the viewing angle $\phi$. In this case, by way of simplicity, the viewing direction 5 is in the X-Z plane. The viewing angle $\phi$ in FIG. 2 is regarded to be positive. Since contrast becomes high when viewed from a direction in the X-Z plane, this direction is called the viewing direction 5.

Performance parameters for a quantification of time-multiplexed driving characteristics in the subsequent description will be briefly described below.

FIG. 1 is a graph showing typical luminance-voltage characteristics of a reflective twisted nematic type liquid crystal display device when its polarizing axes are crossed. Commercially available conventional liquid crystal display devices have acceptable viewing angles falling within a range of 10° to 40°. At a viewing angle $\phi$ of 10°, a driving voltage giving 80% luminance, at which liquid crystal display device begins to appear to be "on" to an observer is designated by Vth1, and a driving voltage giving 20% luminance below which further decrease in luminance begins to be almost imperceptible to the eye is designated by Vsat1, and at a viewing angle $\phi$ of 40°, a driving voltage giving 80% luminance is designated by Vth2.

The sharpness of the luminance-voltage characteristic curve, $\gamma$, the viewing-angle dependence of luminance, $\Delta\phi$, and the time-multiplexability, m are defined as follows:

$$\gamma = Vsat1/Vth1$$

$$\Delta\phi = Vth2/Vth1$$

$$m = Vth2/Vsat1$$

Assuming luminance-voltage characteristic curves are ideal, the two curves at different viewing angles $\phi$ of 10° and 40° coincide, and the curves are steep enough for both a threshold voltage and a saturation voltage to have the same value.

The time-multiplexed driving characteristics of the conventional liquid crystal display device depends on $\Delta n \cdot d$ where $\Delta n$ is the refractive index anisotropy, i.e., optical anisotropy of the liquid crystal and d is the distance between the upper and lower substrates. When $\Delta n \cdot d$ is large (e.g., more than 0.8 μm), the sharpness of the luminance-voltage characteristic, $\gamma$ becomes good (small value), and the viewing-angle dependence, $\Delta\phi$ is poor (small value). However, when $\Delta n \cdot d$ is small (e.g., less than 0.8 μm), the sharpness of the luminance-voltage characteristic, $\gamma$ becomes poor (large value) and the viewing-angle dependence, $\Delta\phi$ becomes good (large value). However, the time-multiplexability, m ($=\Delta\phi/\gamma$) is about the same irrespective of $\Delta n \cdot d$. Two typical examples are shown in Table 1.

TABLE 1

| Performance | $\Delta n \cdot d$ | |
|---|---|---|
| Parameters | 0.5 μm | 1.0 μm |
| $\gamma$ | 1.237 | 1.148 |
| $\Delta\phi$ | 0.938 | 0.874 |
| m | 0.758 | 0.761 |

Time-multiplexed driving will be briefly described with reference to a dot matrix display. As shown in FIG. 3, Y stripe electrodes (signal electrodes) 13 and X stripe electrodes (scanning electrodes) 14 are formed on the lower and upper substrates 12, 11 (not shown), respectively. Pixels (picture elements), liquid crystal portions at intersections of the X and Y electrodes 14 and 13 are chosen to be in an ON state or an OFF state so as to display characters or the like. N scanning electrodes X1, X2, ..., Xn are successively and repeatedly scanned in the order named in a time-multiplexed manner. When a given scanning electrode, e.g., X3 in FIG. 3 is selected, a selection or nonselection display signal is simultaneously applied to all pixels P31, P32, ... and P3m on the given scanning electrode through the signal electrodes 13 constituted by electrodes Y1, Y2, ... and Ym in accordance with a display signal. In other words, the ON or OFF state of the pixels at the intersections of the scanning electrodes and the signal electrodes is determined by a combination of voltage pulses applied to the scanning and signal exectrodes. In this case, the number of scanning electrodes 14 corresponds to the number of time-multiplexing.

The conventional liquid crystal display device has poor time-multiplexed drive characteristics as shown in Table 1, and these characteristics would permit practical time-multiplexing of only a maximum of 32 or 64. However, demand has arisen to improve the image quality of the liquid crystal display device and increase information content to be displayed. Any conventional liquid crystal display devices cannot satisfy these needs.

SUMMARY OF THE INVENTION

It is, therefore, an object of the present invention to provide a liquid crystal display device having a cell structure entirely different from that of the conventional liquid crystal display device, a twist angle $\alpha$, different from 90° of a conventional helical structure of nematic liquid crystal molecules, and a specific range of the ratio of liquid crystal layer thickness to a natural molecular helical pitch of liquid crystal material, thereby providing excellent time-multiplexed drive characteristics and hence higher contrast ratio, wider acceptable range of viewing angles, and less coloring in display even if the number of time-multiplexing, that is, the number of scanning lines is more than 100.

According to one aspect of the present invention there is provided a liquid crystal display device wherein a nematic liquid crystal having a positive dielectric anisotropy and a ratio of liquid crystal layer thickness d(μm) to a natural molecular helical pitch of liquid crystal material P(μm) being from 0.14 to 0.60 inclusive, is sealed between a pair of upper and lower substrates so as to constitute a helical structure twisted within a range of from 140° to 250° along a direction of thickness thereof, polarizing axes or absorption axes of a pair of polarizing plates disposed on the upper and lower substrates are angularly displaced by a predetermined angle or predetermined angles, from major axes of liquid crystal molecules adjacent to the upper and lower substrates, respectively.

DETAILED DESCRIPTION OF THE PREFERRED EMBODIMENTS

Preferred embodiments of the present invention will be described with reference to the accompanying drawings.

Figure 4:
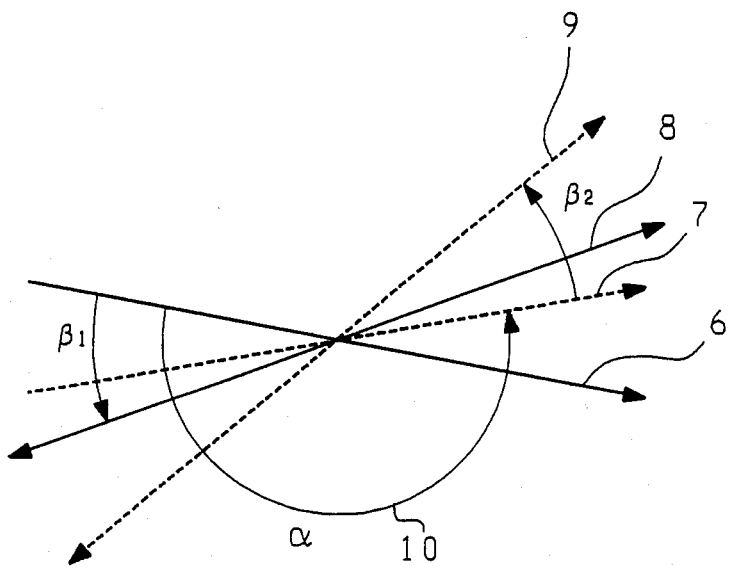
FIG. 4 is a representation for explaining the relationship between the orienting direction, the twist direction of liquid crystal molecules and the axes of polarizers of a liquid crystal display device according to an embodiment of the present invention.

FIG. 4 shows the relationship between the direction (equivalent to, e.g., a rubbing direction) of major axes of the liquid crystal molecules adjacent to the upper or lower substrates, a twist angle thereof, a twist direction thereof, and absorption axes (or polarizing axes) of the polarizers of a liquid crystal display device according to an embodiment of the present invention when the liquid crystal display device is viewed from the upper direction.

Figure 1:
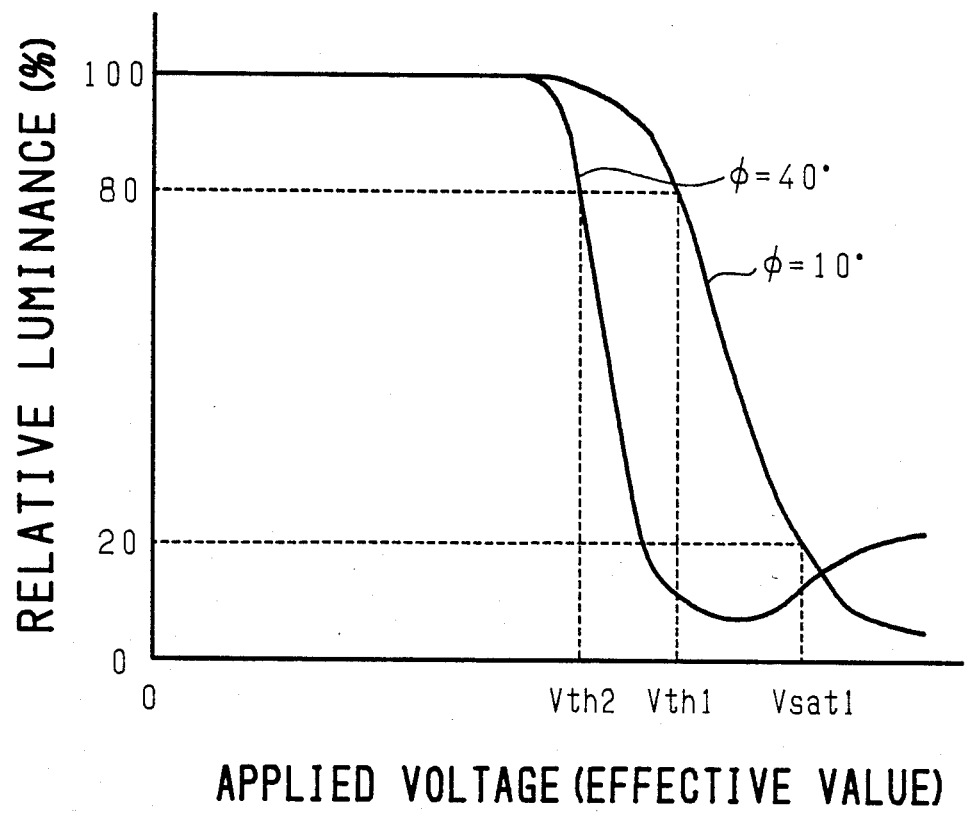
FIG. 1 is a graph showing the luminance-voltage characteristics of a liquid crystal display device used in defining time-multiplexed driving characteristics.
Figure 2:
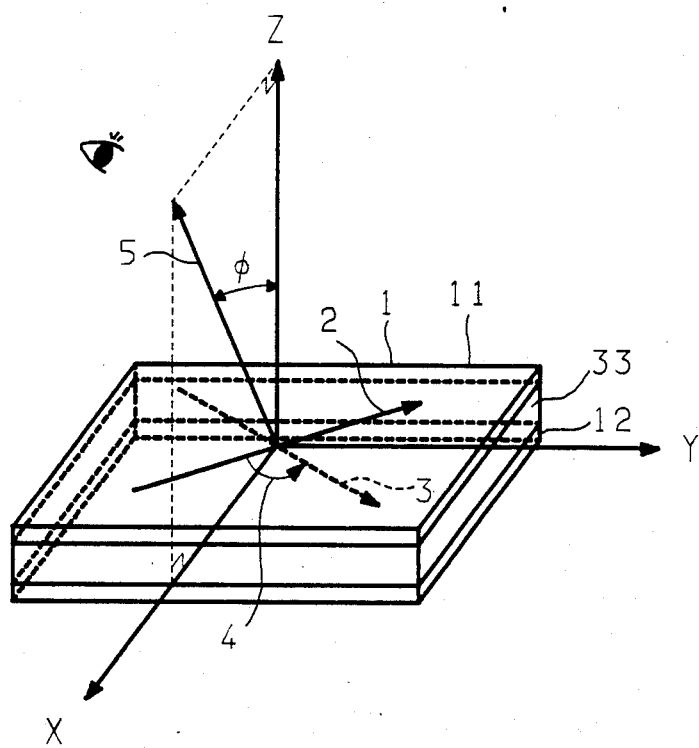
FIG. 2 is a perspective view of the liquid crystal display device for explaining the measuring direction of the time-multiplexed driving characteristics.
Figure 3:
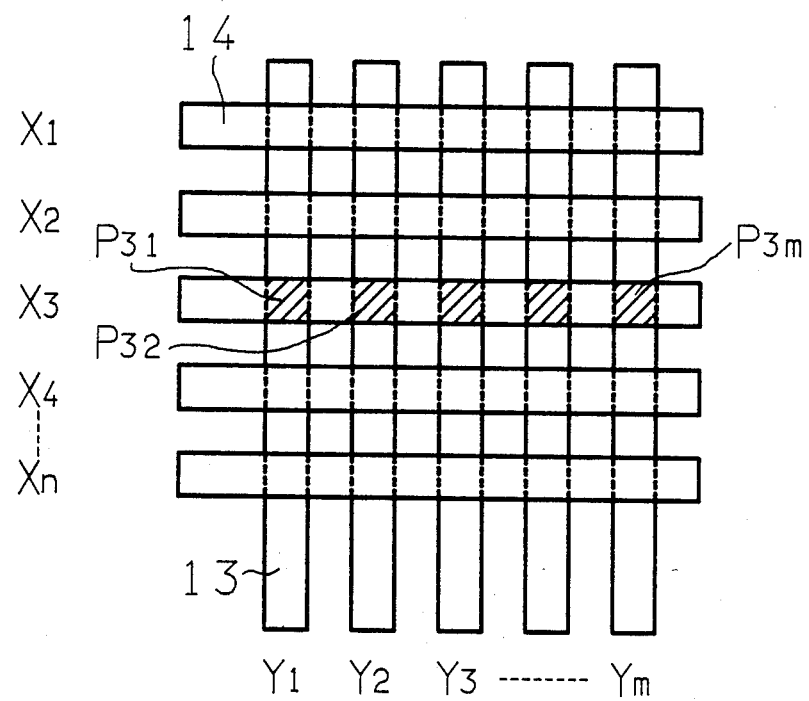
FIG. 3 is a representation for explaining time-multiplexed driving.

In this case, referring to FIG. 2 as well as FIG. 4, liquid crystal molecules 33 are twisted through an angle α counterclockwise from a rubbing direction 6 of an upper substrate 11 and to a rubbing direction 7 of a lower substrate 12. An angle $\beta_1$ between the rubbing direction 6 of the upper substrate 11 and an absorption axis (or polarizing axis) 8 of the upper polarizing plate (not shown) disposed on the upper substrate 11 has the same direction as a twist direction 10 (counterclockwise in this case) of the liquid crystal molecules with respect to the rubbing direction 6 of the upper substrate 11. An angle $\beta_2$ between the rubbing direction 7 of the lower substrate 12 and an absorption axis (or polarizing axis) 9 of the lower polarizing plate (not shown) disposed on the lower substrate 12 is defined in the same manner as the angle $\beta_1$. When an angle of an integer multiple of 180° is added to the angle $\beta_1$ or $\beta_2$, a value of the resultant angle is naturally equivalent to that of the angle $\beta_1$ or $\beta_2$. These equivalent values of the angles $\beta_1$ and $\beta_2$ are represented by their minimum values.

The twist direction 10 (indicated by a curved arrow) and the twist angle α of the liquid crystal molecules 33 are determined by the rubbing direction 6 of the upper substrate 11, the rubbing direction 7 of the lower substrate 12, and the type and an amount of a chiral material added to a nematic liquid crystal. In particular, the twist direction is determined by the type and an amount of chiral material, and the twist angle is determined by the rubbing directions 6 and 7 of the upper and lower substrates 11 and 12. The liquid crystal molecules adjacent to the rubbed inner surfaces of the substrates have alignments roughly at an angle between 1° and 8° to the respective rubbed surfaces when the surfaces coated with polyimide resin are rubbed.

The stability of orientation of the liquid crystal molecules is determined by a specific pitch of the chiral material, an amount thereof, and a thickness of the liquid crystal layer.

In the following explanation, for simplicity, a chiral material having an intrinsic tendency to twist in the direction 10 shown in FIG. 4 is adopted, such as S811 ($C_6H_{13}$

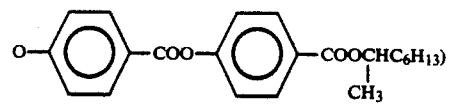

) of Merck(Germany). In general, a natural molecular helical pitch P(μm) of a nematic liquid crystal added with a chiral material is determined by the substance and the concentration of the chiral material. The molecules of the nematic liquid crystal material having a natural 360° helical twist over the axial distance P(μm) of the helix. There is the following relation between the concentration of a chiral material added to a liquid crystal C(%) and the pitch of a helix P(μm), $PC = $ constant.

The twist angle of the helix of the liquid crystal over a given distance d(μm) is 360°×d/P. In a liquid crystal display device the rubbed surfaces force liquid crystal molecules to align in twisted form with major axes of the molecules adjacent to the rubbed surfaces parallel to the respective rubbing directions and with the remaining molecules therebetween having a helical disposition at progressively greater angles with respect to one rubbing direction and decreasing angular disposition toward another rubbing direction.

Figure 5:
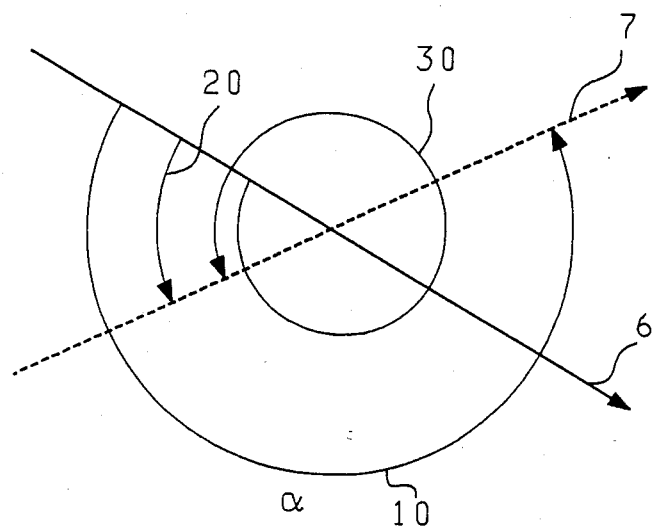
FIG. 5 is a representation for explaining various possible twist angles of liquid crystal molecules.

Referring to FIG. 5, it is apparent that the desired twist angle α and twist direction 10 will be realized when a natural helical pitch P(μm) of a liquid crystal added with a chiral material satisfies the following relation $$\alpha = 360° \, d/P$$

where d(μm) is the thickness of a liquid crystal layer.

But in FIG. 5 a twist angle will be a twist angle designated by reference numeral 20 when d/P is excessively small while it will be a twist angle designated by reference numeral 30 when d/P is excessively large. Twist angles are enforced by the rubbing directions, therefore they have discrete values even when d/P varies continuously. The twists designated by reference numerals 10, 20, and 30 are hereinafter called normal twist, undertwist and overtwist, respectively.

The undertwist 20 occurs when $$(d/P) < (\alpha - 90°)/360° \quad (1)$$

The overtwist 30 occurs when $$(d/P) > (\alpha + 90°)/360° \quad (2)$$

The normal twist 10 occurs when $$(\alpha - 90°)/360° \leq (d/P) \leq (\alpha + 90°)/360° \quad (3)$$

Some experiments showed that even when a normal twist of a liquid crystal was realized in a liquid crystal display device, the liquid crystal sometimes produces a molecular orientation to scatter light with driving voltages applied thereon. The scattering of light lowers display contrast extremely and such a liquid crystal display device is not useful.

Figure 6:
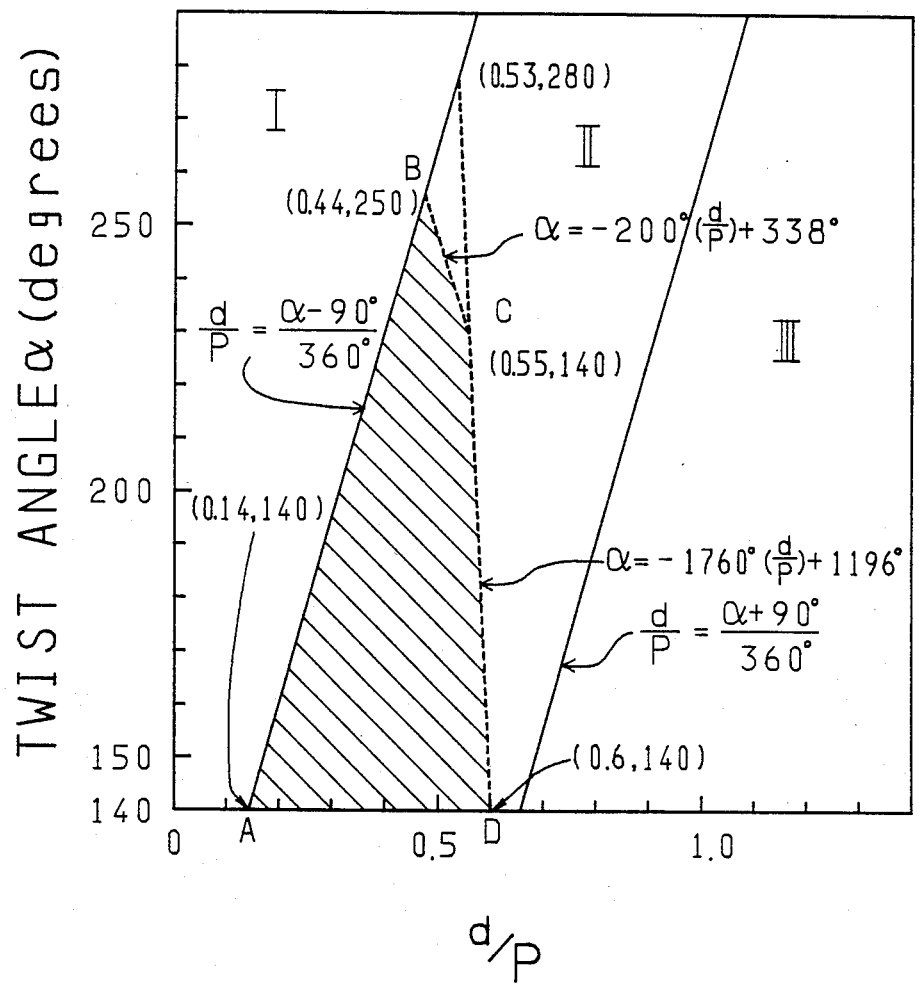
FIG. 6 is a graph showing allowable ranges for twist angles α and ratio d/P of a liquid crystal display device according to the present invention.

By further detailed studies it was found that liquid crystal display devices have a normal twist and produce no orientation of liquid crystal molecules which cause scattering of light with driving voltages applied thereon if both the twist angle $\alpha$ of liquid crystal molecules determined by rubbing directions and the ratio d/P lie in the shaded region ABCDA of FIG. 6. The heavy line AB is derived from the abovementioned inequality (3). The dashed lines BC and CD are obtained experimentally.

The lower limits of d/P is determined by the inequality (3), and the upper limits of d/P is given by the following inequalities.

$$\alpha \leq -200° (d/P) + 338° \quad (4)$$

$$\alpha \leq -1760° (d/P) + 1196° \quad (5)$$

The maximum value of d/P is 0.6. The maximum twist angle $\alpha$ is 250°, but practically preferable maximum value of $\alpha$ is 240° in consideration of precision of spacing between substrates and thermal variation of pitch of liquid crystal material added with a chiral material.

The minimum twist angle $\alpha$ is 140° determined by twist angle dependence of display colors and time-multiplexed driving characteristics, resulting in the acceptable minimum value of d/P being 0.14.

Regions I, II, and III in FIG. 6 indicate regions where the undertwist, the normal twist, and the overtwist occur, respectively.

The results shown in FIG. 6 were obtained by using orienting layers for liquid crystal molecules which are formed by rubbing surfaces of substrates coated with resin such as poly-imide resin, for instance, polyimide-isoindoloquinazolinedione as described in Japanese Patent Publication (Kokoku) No. 58 (1983)-23610, or polyimide-benzoimidazopyrrolone as described in Japanese Unexamined Patent Publication (Kokai) No. 54(1979)-133 358. The liquid crystal molecules immediately adjacent to the rubbed surfaces lie at an angle of less than 6°. The results of FIG. 6 can be applied to liquid crystal display devices with the orienting layers capable of orienting liquid crystal molecules as above.

Referring to FIG. 4, the angle $\beta 1$ between the absorption axis (or polarizing axis) 8 of the upper polarizing plate disposed on the upper substrate 11 and the rubbing direction 6 of the upper substrate 11 and the angle $\beta 2$ between the absorption axis (or polarizing axis) 9 of the lower polarizing plate disposed on the lower substrate 12 and the rubbing direction 7 of the lower substrate 12, respectively, fall, acceptably within the range of from 20° to 70° inclusive, and preferably within the range of from 30° to 60° inclusive when contrast, luminance, color, time-multiplexing drive characteristics, and the like are considered.

The twist direction 10 of the helical structure is counterclockwise in the above embodiment, and the angles $\beta 1$ and $\beta 2$ are defined counterclockwise, but when the twist direction of the helical structure is clockwise, the angles $\beta 1$ and $\beta 2$ can be defined correspondingly clockwise, and the same effects can be obtained as in the above embodiment.

The characteristics of the liquid crystal display device according to the present invention greatly depend on $\Delta n.d$, i.e., an optical path difference, d and $\Delta n$ being a thickness in $\mu m$ and an optical anisotropy of the liquid crystal layer, respectively. When the optical path difference satisfies the condition $0.8 \mu m \leq \Delta n.d \leq 1.2 \mu m$, the characteristics in terms of time-multiplexed driving, contrast ratio, luminance, color and the like are satisfactory, and the characteristics are best when $0.9 \mu m \leq \Delta n.d \leq 1.1 \mu m$.

The optical anisotropy $\Delta n$ generally depends on measuring wavelengths. The optical anisotropy is increased when the wavelength is short, while it is decreased when the wavelength becomes long. The optical anisotropy $\Delta n$ value in this specification is measured by using an He-Ne laser beam of a wavelength of 6,328 Å at a temperature of 25° C. When the optical anisotropy is measured at another wavelength, the values may be slightly different from the values in this specification.

The construction and the measured results of the liquid crystal display device according to an embodiment of the present invention will be described hereinafter.

Figure 7:
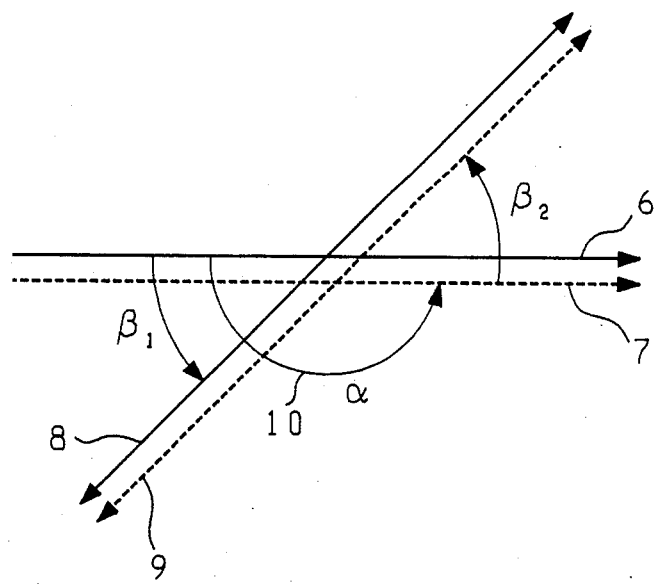
FIGS. 7 and 8 are representations for explaining the relationship between the orienting direction, the twist direction of liquid crystal molecules, and the axes of polarizers of a liquid crystal display device according to other embodiments of the present invention, respectively.

FIG. 7 shows the relationship between the rubbing direction of the substrates, the twist direction and twist angle of the helical structure of the liquid crystal molecules, and the absorption axes of the polarizers when the liquid crystal display device is viewed from the upper direction.

A liquid crystal used in this device comprises a nematic liquid crystal. This nematic liquid crystal contains as a major constituent phenylcyclohexane (PCH) liquid crystal, and as an additive a chiral material S811 of Merck, the amount of which is determined to obtain the ratio d/P of about 0.4, and may be between 0.4% and 0.9% by weight. The optical anisotropy $\Delta n$ of this liquid crystal mixture is 0.143.

The angle between the rubbing directions 6 and 7 of the upper and lower substrates 11 and 12 is 180°, the twist direction upon addition of the chiral material S811 is represented by reference numeral 10 (counterclockwise), and the twist angle $\alpha$ is 180°. The angle $\beta 1$ between the rubbing direction 6 and the absorption axis 8 of the upper polarizer and the angle $\beta 2$ between the rubbing direction 7 and the absorption axis 9 of the lower polarizer are respectively 45°.

A number of liquid crystal devices with the arrangement of FIG. 7 and various values of thickness d of liquid crystal layers resulting in various values of optical path difference $\Delta n.d$ have been constructed for testing displayed colors and luminance. Test results are shown in Table 2.

TABLE 2

| $\Delta n \cdot d$ ($\mu m$) | Luminance | Color |
|---|---|---|
| 0.63 | dark | deep blue to purple |
| 0.76 | dark | light blue |
| 0.86 | slightly bright | green |
| 1.00 | bright | yellowish green |
| 1.14 | bright | reddish orange |
| 1.30 | slightly dark | reddish purple |
| 1.43 | dark | bluish green |

It was found that both colors and luminance of the liquid crystal display device were best and satisfactory when the optical path difference $\Delta n.d$ was about 1.00 $\mu m$, and by further detailed studies it was also found that no problem occurred in practice when the optical path difference $\Delta n.d$ fell within the range from 0.8 $\mu m$ to 1.20 $\mu m$ inclusive with the relationship shown in FIG. 7. And results similar to those of Table 2 can be obtained with the FIG. 4 arrangement when the twist angle $\alpha$ falls within a range between 140° and 250°, the displacement angles $\beta 1$ and $\beta 2$ fall within a range of from 20° to 70°, the product Δn.d falls within a range of from 0.8 μm to 1.20 μm, and the ratio d/P satisfies the relation 0.14≦d/P≦0.6, without raising any practical problems.

The measured results of the time-multiplexed drive characteristics of the liquid crystal cell having the optical path difference Δn.d of 1.00 μm are shown in Table 3 according to the liquid crystal device of the present invention. The sharpness of luminance-voltage characteristic, γ, the viewing-angle dependence, Δφ and the time-multiplexability, m are greatly improved compared with those values of the conventional liquid crystal display device shown in Table 1.

TABLE 3

| | |
|---|---|
| γ | 1.077 |
| Δφ | 0.973 |
| m | 0.903 |

In FIG. 7, the polarizing axes of the polarizing plates can be arranged in place of the absorption axes to obtain the similar effects. In the above embodiment, a liquid crystal mixture containing as a major constituent phenylcyclohexane (PCH) liquid crystals is used. However, any other nematic liquid crystal having a positive dielectric anisotropy may be used to obtain almost the same effects as in the above embodiment. Further, in order to improve contrast and color in display some dyes can be added into a liquid crystal mixture without degrading performance of a liquid crystal display device according to the present invention.

Figure 8:
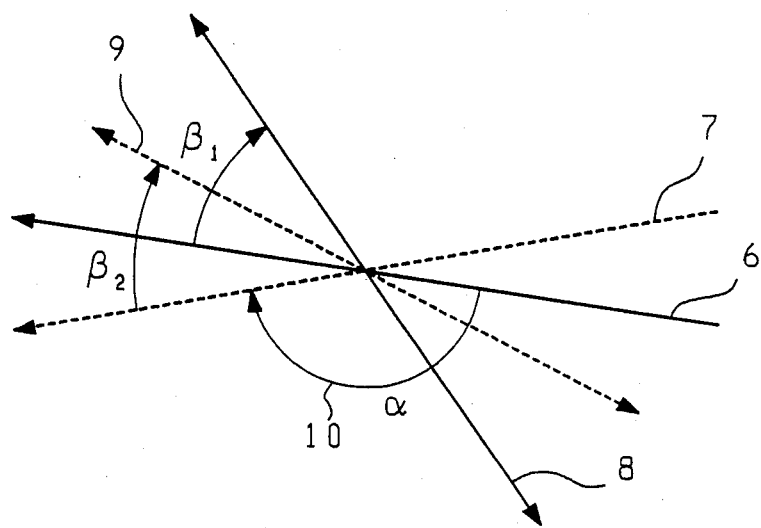

The twist direction of the helical structure is counterclockwise in the above embodiments, but, as shown in FIG. 8, the twist direction may be clockwise to obtain the same effects as in the above embodiments.

In the above embodiments, the polarizing axes or absorption axes of the upper and lower polarizing plates are angularly displaced from the direction of major axes of liquid crystal molecules adjacent to the substrates in the same direction as the twist of the liquid crystal molecules, but they can be angularly displaced in the direction opposite to the twist with the similar results obtained, and the diplacement angle β1 can be different from the diplacement angle β2.

The type of a chiral material is not particularly limited to the above chiral material if the relationships between the rubbing directions and the twist directions shown in FIGS. 4, 7 and 8 can be satisfied.

What is claimed is:

1. A liquid crystal display device wherein a nematic liquid crystal having a positive dielectric anisotropy and added with a chiral material is sealed between a pair of upper and lower substrates with electrodes thereon and orienting layers formed on the electrodes and exposed surfaces thereof so as to constitute a helical structure twisted within a range between 140° and 250° along a direction of thickness thereof, polarizing axes or absorption axes of a pair of polarizing plates disposed on said upper and lower substrates are angularly displaced by a predetermined angle or predetermined angles from major axes of liquid crystal molecules adjacent to said upper and lower substrates, respectively, and a ratio of thickness of said liquid crystal to a natural molecular helical pitch of said nematic liquid crystal added with said chiral material falls within a range of from 0.14 to 0.60 inclusive.

2. A device according to claim 1, wherein said absorption axis or said polarizing axis of each of said polarizing plates and a direction of a corresponding one of said major axes of the liquid crystal molecules adjacent to said upper and lower substrates constitute an included angle falling within a range of from 20° to 70°.

3. A device according to claim 1, wherein a product Δn.d of a thickness d (μm) of a liquid crystal layer and its optical anisotropy Δn falls within a range from 0.8 μm to 1.2 μm inclusive.

4. A device according to claim 1, wherein said orienting layers are formed by rubbing surfaces coated by resin, of electrodes and exposed surfaces.

5. A liquid crystal display device wherein a nematic liquid crystal having a positive dielectric anisotropy and added with a chiral material is sealed between a pair of upper and lower substrates with electrodes thereon and orienting layers formed on the electrodes and exposed surfaces thereof so as to constitute a helical structure twisted within a range between 140° and 250° along a direction of thickness thereof, polarizing axes or absorption axes of a pair of polarizing plates disposed on said upper and lower substrates are angularly displaced by an angle between 20° and 70° from major axes of liquid crystal molecules adjacent to said upper and lower substrates, respectively, and a product Δn.d of a thickness d (μm) and an optical anisotropy Δn of a liquid crystal layer falls within a range of from 0.8 μm to 1.2 μm, and a ratio of the thickness d of said liquid crystal to a natural molecular helical pitch P of said liquid crystal added with said chiral material falls within a range of from 0.14 to 0.60 inclusive.

6. A device according to claim 5, wherein said orienting layers are formed by rubbing surfaces coated with resin, of electrodes and exposed surfaces.

7. A liquid crystal display device wherein a nematic liquid crystal having a positive dielectric anisotropy and added with a chiral material is sealed between a pair of upper and lower substrates with electrodes thereon and orienting layers formed on the electrodes and exposed surfaces thereof so as to constitute a helical structure twisted within a range between 140° and 250° along a direction of thickness thereof, polarizing axes or absorption axes of a pair of polarizing plates disposed on said upper and lower substrates are angularly displaced by a predetermined angle or predetermined angles from major axes of liquid crystal molecules adjacent to said upper and lower substrates, respectively, and a ratio, d/P of thickness of said liquid crystal, d to a natural molecular helical pitch of said nematic liquid crystal added with said chiral material, P and a twist angle of said helical structure, α lie in a region enclosed by the following equations, $$(\alpha - 90°)/360° = d/P,$$

$$\alpha = 200° \, (d/P) + 338°,$$

$$\alpha = -1760° \, (d/P) + 1196°,$$

and $$\alpha = 140°.$$

8. A device according to claim 7 wherein said predetermined angle or angles fall within a range of from 20° to 70°.

9. A device according to claim 1, wherein a product Δn.d of a thickness d (μm) of a liquid crystal layer and its optical anisotropy Δn falls within a range from 0.8 μm to 1.2 μm inclusive.

* * * * *

(12) EX PARTE REEXAMINATION CERTIFICATE (5179th)
United States Patent
Kando et al.

(10) Number: US 4,653,865 C1
(45) Certificate Issued: Aug. 16, 2005

(54) LIQUID CRYSTAL DISPLAY DEVICE

(75) Inventors: Yasuhiko Kando, Mobara (JP); Tamihito Nakagomi, Mobara (JP); Shinji Hasegawa, Mobara (JP); Yoshio Hanada, Mobara (JP)

(73) Assignee: Hitachi, Ltd., Tokyo (JP)

Reexamination Request:
No. 90/005,024, Jun. 24, 1998

Reexamination Certificate for:
Patent No.: 4,653,865
Issued: Mar. 31, 1987
Appl. No.: 06/847,166
Filed: Apr. 2, 1986

(30) Foreign Application Priority Data

Apr. 5, 1985 (JP) ............................................. 60-70950

(51) Int. Cl.$^7$ ........................ G02F 1/139; G02F 1/1335
(52) U.S. Cl. ........................ 349/101; 349/103; 349/180
(58) Field of Search ........................... 349/96, 99, 136, 349/101, 179, 180, 181, 103

(56) References Cited

U.S. PATENT DOCUMENTS 4,619,500 A * 10/1986 Ahne et al. ................. 349/132
4,634,229 A * 1/1987 Amstutz et al. ............ 349/101
4,664,482 A  5/1987 Kando et al.

FOREIGN PATENT DOCUMENTS

| EP | 0 131 216 | 3/1985 |
| JP | 56-156816 | 12/1981 |
| JP | 56-162722 | 12/1981 |
| JP | 57-23328 | 2/1984 |

OTHER PUBLICATIONS

Shimomura et al, Japanese Appl. Phys. vol. 46, No. 12, 1977.
SID 85 Digest, pp. 120–123.
IEEE Transactions on Electron Device, vol. ED–23, No. 10, Oct. 1976.
Sanyo Technical Review, vol. 19, No. 1, Feb. 1987.
"Electro–Optical Properties of Supertwisted Nematic Display Obtained by Rubbing Technique", M. Akatsuka et al, Asahi Glass Electronic Products R&D Center Co., Ltd., Yokohama Japan, pps. 159–165—Proceedings of the SID—1987.
"8.1: 640×400 Pixel LCD Using Highly Twisted Birefrigence Effect with Low Pretilt Angle", K. Kinugawa et al, Mobara Works, Hitachi, Ltd., Mobara, Chiba, Japan, pps. 122–125—SID 1986.

* cited by examiner

Primary Examiner—Tai Duong

(57) ABSTRACT

A liquid crystal display device wherein a nematic liquid crystal having a positive dielectric anisotropy and added with a chiral material is sealed between a pair of upper and lower substrates so as to constitute a helical structure twisted within a range between 140° and 250° along a direction of thickness thereof, and polarizing axes or absorption axes of a pair of polarizing plates disposed on the upper and lower substrates are angularly displaced by a predetermined angle or predetermined angles from major axes of liquid crystal molecules adjacent to the upper and lower substrates, respectively, and a ratio of thickness of the nematic liquid crystal to a natural molecular helical pitch of the nematic liquid crystal added with a chiral material falls within a range of from 0.14 to 0.60 inclusive.

(AMENDED)

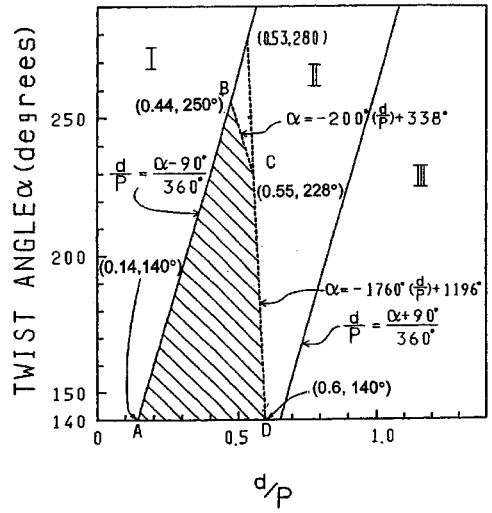

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

THE DRAWING FIGURES HAVE BEEN CHANGED AS FOLLOWS:

In FIG. 6 value of point C has been changed to C (0.55, 228°).

AS A RESULT OF REEXAMINATION, IT HAS BEEN DETERMINED THAT:

Claims 4 and 6 are cancelled.

Claims 1, 5, 7 and 9 are determined to be patentable as amended.

Claims 2, 3 and 8, dependent on an amended claim, are determined to be patentable.

New claims 10–15 are added and determined to be patentable.

1. A liquid crystal display device wherein a nematic liquid crystal having a positive dielectric anisotropy and added with a chiral material is sealed between a pair of upper and lower substrates with electrodes thereon and orienting layers formed on the electrodes and exposed surfaces thereof so as to constitute a helical structure twisted within a range between 140° and 250° along a direction of thickness thereof, polarizing axes or absorption axes of a pair of polarizing plates disposed on said upper and lower substrates are angularly displaced by a predetermined angle or predetermined angles from major axes of liquid crystal molecules adjacent to said upper and lower substrates, respectively, and a ratio of thickness of said liquid crystal to a natural molecular helical pitch of said nematic liquid crystal added with said chiral material falls within a range of from 0.14 to 0.60 inclusive, *wherein said orienting layers are formed by rubbing surfaces coated with resin, of said electrodes and exposed surfaces of both said upper and lower substrates so as to provide a pretilt angle less than 5°.*

5. A liquid crystal display device wherein a nematic liquid crystal having a positive dielectric anisotropy and added with a chiral material is sealed between a pair of upper and lower substrates with electrodes thereon and orienting layers formed on the electrodes and exposed surfaces thereof so as to constitute a helical structure twisted within a range between 140° and 250° along a direction of thickness thereof, polarizing axes or absorption axes of a pair of polarizing plates disposed on said upper and lower substrates are angularly displaced by an angle between 20° and 70° from major axes of liquid crystal molecules adjacent to said upper and lower substrates, respectively, and a product $\Delta n.d$ of a thickness d ($\mu$m) and an optical anisotropy $\Delta n$ of a liquid crystal layer falls within a range of from 0.8 $\mu$m to 1.2 $\mu$m, and a ratio of the thickness d of said liquid crystal to a natural molecular helical pitch P of said liquid crystal added with said chiral material falls within a range of from 0.14 to 0.60 inclusive, *wherein said orienting layers are formed by rubbing surfaces coated with resin, of said electrodes and exposed surfaces of both said upper and lower substrates so as to provide a pretilt angle less than 5°.*

7. A liquid crystal display device wherein a nematic liquid crystal having a positive dielectric anisotropy and added with a chiral material is sealed between a pair of upper and lower substrates with electrodes thereon and orienting layers formed on the electrodes and exposed surfaces thereof so as to constitute a helical structure twisted within a range between 140° and 250° along a direction of thickness thereof, polarizing axes or absorption axes of a pair of polarizing plates disposed on said upper and lower substrates are angularly displaced by a predetermined angle or predetermined angles from major axes of liquid crystal molecules adjacent to said upper and lower substrates, respectively, and a ratio, d/P of thickness of said liquid crystal, d to a natural molecular helical pitch of said nematic liquid crystal added with said chiral material, P and a twist angle of said helical structure, $\alpha$ lie in a region enclosed by the following equations, $$(\alpha - 90°)/360° = d/P,$$

$$\alpha = -200° (d/P) + 338°,$$

$$\alpha = -1760° (d/P) + 1196°,$$

and $$\alpha = 140°.$$

9. A device according to claim [1] *7*, wherein a product $\Delta n.d$ of a thickness d ($\mu$m) of a liquid crystal layer and its optical anisotropy $\Delta n$ falls within a range of 0.8 $\mu$m to 1.2 $\mu$m inclusive.

*10. A liquid crystal display device according to claim 1, wherein a relation of (d/P, $\alpha$) is provided, where d/P is the ratio of thickness d of said liquid crystal to a natural molecular pitch P of said nematic crystal added with said chiral material, and $\alpha$ is the twist angle of said helical structure, and wherein the relation (d/P, $\alpha$) has at least one value of d/P of 0.14 and the twist angle $\alpha$ of 140°.*

*11. A liquid crystal display device according to claim 5, wherein a relation of (d/P, $\alpha$) is provided, wherein d/P is the ratio of thickness d of said liquid crystal to a natural molecular pitch P of said nematic crystal added with said chiral material, and $\alpha$ is the twist angle of said helical structure, and wherein the relation (d/P, $\alpha$) has at least one value of d/P of 0.14 and the twist angle $\alpha$ of 140°.*

*12. A liquid crystal display device wherein a nematic liquid crystal having a positive dielectric anisotropy and added with a chiral material is sealed between a pair of upper and lower substrates with electrodes thereon and orienting layers formed on the electrodes and exposed surfaces thereof so as to constitute a helical structure twisted within a range between 140° and 250° along a direction of thickness thereof, polarizing axes or absorption axes of a pair of polarizing plates disposed on said upper and lower substrates are angularly displaced by a predetermined angle or predetermined angles from major axes of liquid crystal molecules adjacent to said upper and lower substrates, respectively, and a ratio d/P of thickness of said liquid crystal, d to a natural molecular helical pitch of said nematic liquid crystal added with said chiral material, P falls within a range of from 0.14 to 0.60 inclusive, the liquid* crystal display device having a relation (d/P, α) with respect to a twist angle α of said helical structure so as to delimit a region enclosed by lines connecting points represented as about (d/P=0.14, α=140°), (d/P=0.44, α=250°), (d/P=0.55, α=228°) and (d/P=0.60, α=140°).

13. A device according to claim 12, wherein said absorption axis or said polarizing axis of each of said polarizing plates and a direction of a corresponding one of said major axes of the liquid crystal molecules adjacent to said upper and lower substrates constitute an included angle falling within a range of from 20° to 70°.

14. A device according to claim 12, wherein a product Δd·d of a thickness d (μm) of a liquid crystal layer and its optical anisotropy Δn falls within a range from 0.8 μm to 1.2 μm inclusive.

15. A liquid crystal display device wherein a nematic liquid crystal having a positive dielectric anisotropy and added with a chiral material is sealed between a pair of upper and lower substrates with electrodes thereon and orienting layers formed on the electrodes and exposed surfaces thereof so as to constitute a helical structure twisted within a range between 140° and 250° along a direction of thickness thereof, polarizing axes or absorption axes of a pair of polarizing plates disposed on said upper and lower substrates are angularly displaced by an angle between 20° and 70° from the major axes of liquid crystal molecules adjacent to said upper and lower substrates, respectively, and a product Δn·d of a thickness d (μm) and an optical anisotropy Δn of a liquid crystal layer falls within a range of from 0.8 μm to 1.2 μm, and a ratio of thickness of d of said liquid crystal to a natural molecular helical pitch P of said liquid crystal added with said chiral material falls within a range of from 0.14 to 0.60 inclusive, and provides a relation (d/P, α) with respect to a twist angle α of said helical structure so as to delimit a region enclosed by points represented as about (d/P=0.14, α=140°), (d/P=0.44, α=250°), (d/P=0.55, α=228°) and (d/P=0.60, α=140°).

\* \* \* \* \*